Jan. 24, 1967 G. C. WRIGHT 3,300,208

CARD POSITIONING APPARATUS AND METHOD

Filed March 1, 1965 2 Sheets-Sheet 1

INVENTOR.
GERARD C. WRIGHT

BY [signature]
[signature]
ATTORNEYS

INVENTOR.
GERARD C. WRIGHT

BY Norman P. Schuler
Donald F. Daley
ATTORNEYS 3,300,208

CARD POSITIONING APPARATUS AND METHOD

Gerard C. Wright, Pittsford, N.Y., assignor to Xerox Corporation, Rochester, N.Y., a corporation of New York Filed Mar. 1, 1965, Ser. No. 435,802
3 Claims. (Cl. 271—46)

This invention relates to method and apparatus for spacing and aligning objects on a moving conveyor and particularly to method and apparatus to time and align data processing cards or the like on a moving belt conveyor system.

Data processing cards are currently being used in the reproduction of documentary material. Reduced images of documents such as letters, engineering drawings and the like are being placed on data processing cards by xerographic techniques. The cards containing the images are used to file or store reproductions of the original document. They are also capable of being used to reproduce copies of the original document. Cards of this type are produced on machines such as that disclosed in copending application Serial No. 436,168, filed on March 1, 1965, in the names of Thomas H. Galster, Allen M. Hitchcock and Gordon P. Taille.

Machines of the type disclosed in the copending application 436,168, also are capable of reproducing cards from data processing cards having an image thereon. When it is necessary to scan an image on a data processing card, that card must be moved through a scanning station and properly timed and aligned so that the image scanned will appear in the proper registration on a rotating xerographic drum and ultimately be accurately aligned and registered on moving cards coming in contact with the xerographic drum. The movement of the cards containing images past a scanning station is accomplished by means of a moving belt conveyor system. However, placing the card on the conveyor system in an exact position so that the card passes the scanning station in proper alignment and in the exact position that the resultant image will appear on the surface of a rotating drum, within the tolerances required, is extremely difficult. Applicant's invention provides apparatus to position and align the cards on the moving belt so that the cards are moved past a fixed point in accurate timed sequence, thus eliminating close synchronization of the card feeder and the moving belt.

It is the primary object of this invention to uniformly space and accurately position objects on a moving belt conveyor system.

It is also an object of this invention to time the scanning of images on data processing cards so that images reproduced from the card will be registered on a support material surface within required tolerances.

It is also an object of this invention to improve card conveyors to accurately time the movement of data processing cards past a scanning station.

These and other objects of this invention are attained by means of a rotating blade which permits passage of a data processing card moving on a conveyor belt system only when the card is properly aligned and at the proper time.

For a better understanding of the invention as well as other objects and further features thereof, reference is had to the following description of the invention to be read in connection with the accompanying drawings, wherein:

FIGS. 1, 2 and 3 show a conveyor belt system for use with the present invention wherein cards containing images may be moved past a scanning station in timed sequence.

Figure 1:
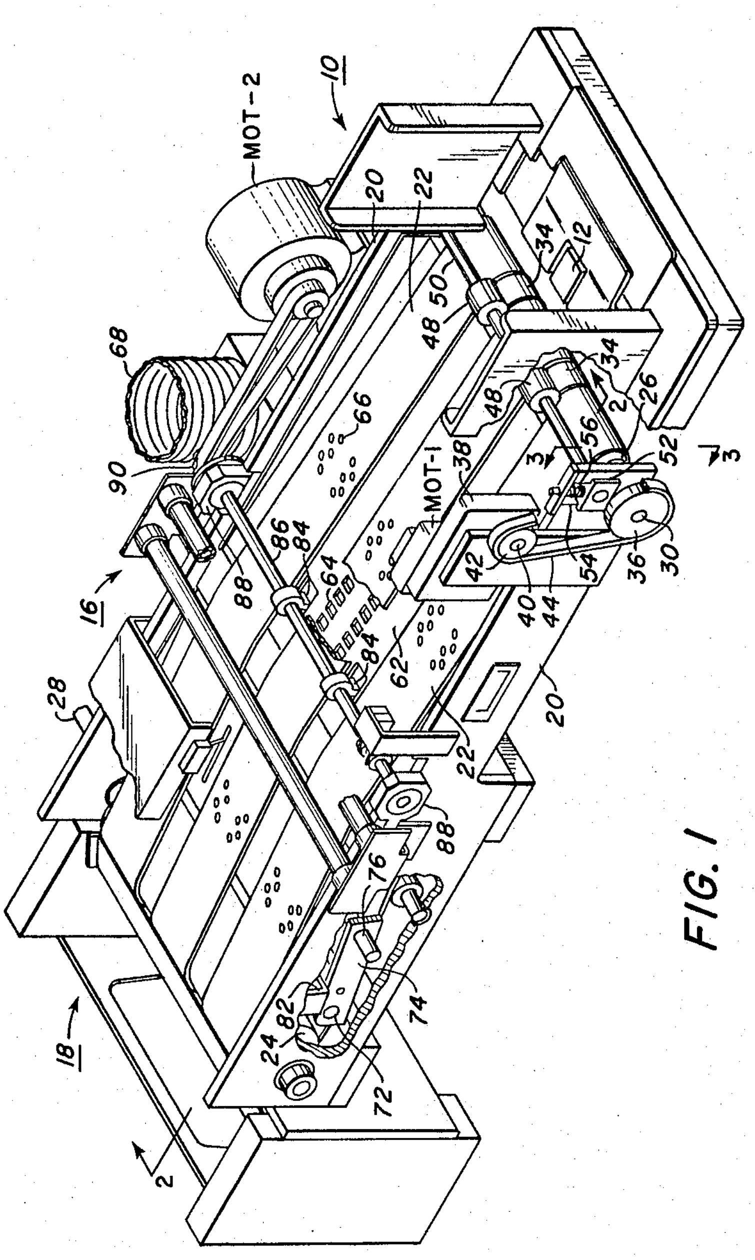
FIG. 1 is an isometric view of a conveyor belt system suitable for use in transporting data processing cards and embodying the present invention and having portions broken away to show internal construction of the apparatus.
Figure 2:
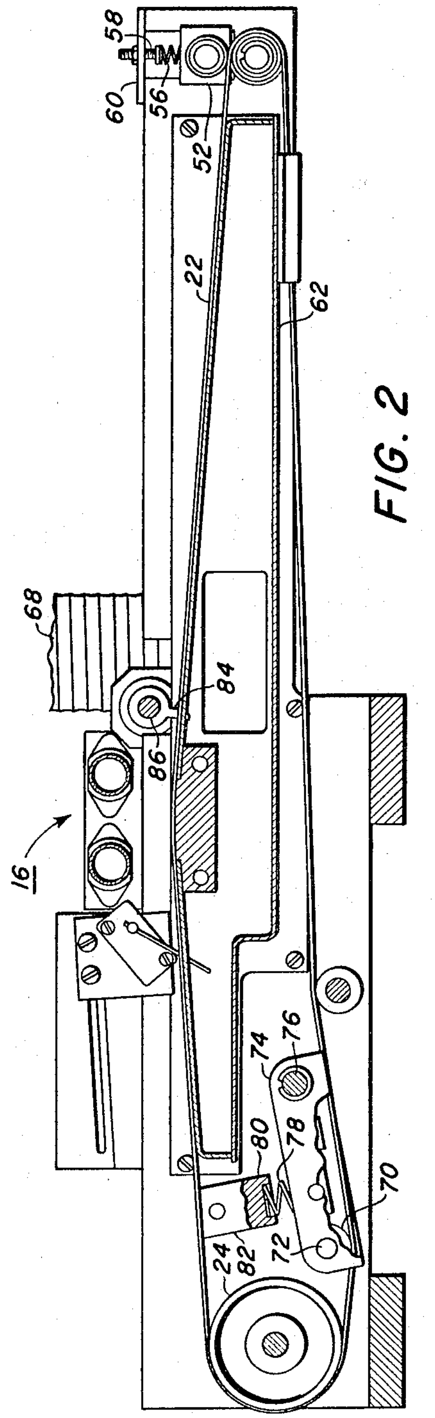
FIG. 2 is a sectional view taken along lines 1—1 of FIG. 1 with portions broken away to show hidden details.

A stack of cards to be reproduced may be inserted into a card feeder generally designated 10. The card feeder is of a conventional type which has a card picker 12 mounted for reciprocal movement in the bottom of the card feeder to advance the bottom-most card to a position in which it may be picked up by the conveyor system. The card feeder is mounted at one end of a continuous conveyor system 14 which is adapted to carry cards from the card feeder past a scanning station 16 to a discharge hopper 18.

The conveyor system 14 is mounted in a pair of side frames 20 and consists of three conveyor belts 22 mounted for rotation about a drive roller 24 and an idler roller 26. The drive roller 24 is mounted on a shaft 28 journaled in the side frames 20 and is driven from a suitable drive system, not shown. The drive system may be of any conventional type but is synchronized with the movement of the surface upon which the image on the card is to be reproduced so that the linear speed of the belts 22 is that required to accurately reproduce the image without producing distortion in the direction of movement.

Figure 3:
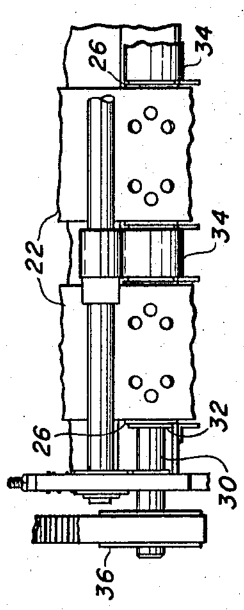
FIG. 3 is an enlarged view of a portion of the card feeding roller shown in FIG. 1; and, FIG. 4 is a schematic view of one embodiment of the card timing device.

The idler roller 26 consists of a series of three collars loosely journaled on a shaft 30. The collars constituting roller 172 are positioned on the shaft 30 to correspond to the position of the belts 22 and are held in position on the shaft 30 by means of O-rings 32, as seen in FIG. 3. The rollers 26 are rotated about the shaft 30 by the belts 22. The shaft 30 is journaled in side frames 20 and has a pair of card feed rollers 34 secured thereto between the collars of idler roller 26.

The shaft 30 extends through one side of the side plates 20 and has a timing belt sprocket 36 secured thereto to provide movement of the shaft 30. A motor MOT–1 provides driving power through a transmission 38 to a shaft 40. A timing belt sprocket 42 secured to the shaft 40 drives a timing belt 44 which extends around the sprocket 36 and drives shaft 30. The motor MOT–1 and the transmission 38 are secured to a bracket 46 mounted on the side frame 20. The motor, transmission and timing belt drive provide the rotational movement of the drive rollers 34 to move cards fed by the picker 12 in the card feeder 10 onto the conveyor belts 22. The picker advances the card between the drive rollers 34 and a pair of idler rollers 48 mounted on a shaft 50 directly above and in contact with the drive rollers 34. The shaft 50 is rotatably journaled in a pair of sliding blocks 52 which are slidably mounted in the side frames 20. The blocks 52 are urged downward so that the idler rollers are in contact with drive rollers by compression springs 56. The amount of pressure between the idler roller 48 and drive rollers 34 is controlled by adjustable stops 58 mounted in small cover plates 60, secured to the frame members 20 above the slots 54. The stops 58 abut one end of the compression springs 56 and are adjustable to vary the spring pressure on the blocks 52.

The conveyor system is of the vacuum type wherein air is drawn into a series of openings in a manifold beneath the surface of the conveyor belts, and the conveyor belts are perforated to allow the pressure produced by the vacuum to hold the cards on the surface of the belt. The vacuum manifold is designated 62 and has a series of openings 64 positioned beneath the belts. The belts 22 contain a series of perforations 66. Air is exhausted from the manifold through a conduit 68 which is attached to a suitable exhaust fan or vacuum system, not shown. Exhausting the air from the manifold 62 produces a suction through the openings 64 and the perforations 66 so that the cards are held on the surface of the belt conveyor.

The belts 22 are placed in tension and held against the top surface of the manifold 62 by means of belt tensioning rollers 70. The rollers 70 are mounted on shaft 72 which is journaled in a pair of movable arms 74. The movable arms 74 pivot about a shaft 76 journaled in the side frame members 20. A pair of compression springs 78 are positioned between the movable arms 74 and a pair of spring guides 80 mounted on brackets on each of the side frames 20. The springs 78 force the movable arms 74 downward so that the tensioning rollers 70 press against the belts 22 providing proper tension for the belts and holding the belts against the top surface of the manifold 62.

As individual cards are fed from the bottom of the stack in the card feeder 10, they are advanced onto the conveyor belts 22 by the drive rollers 34 and the idler rollers 48. The card is carried forward by the belts 22 until they strike a pair of timing blades 84. The blades 84 extend downward from a shaft 86 at a point immediately ahead of the scanning station 16. The arms 84 extend between the conveyor belts 22 so that, in a downward position, they are in interfering relationship to the path of movement of a card on the belts 22. The shaft 86 is journaled in a pair of bearings 88 and has a pulley 90 on one end thereof. The pulley 90 and the shaft 86 are driven by a belt which extends from a drive source, shown as motor MOT–1, around the pulley 90. The shaft is driven in timed relation to the movement of the surface on which the image on the data processing card is to be reproduced. Cards moving on the belt strike both blades 84 at the same time so that the relative position of the card on the conveyor is adjusted to insure that the card is properly registered on the conveyor; that is, if the card is cocked on the conveyor, it will strike one blade first and be rotated until it engages both blades at the same time.

The axis of the shaft 86 is positioned above the top surface of the belts 22 so that the card timing blade 84 extends downward to a point beneath the surface of the belts and the distance from the shaft axis to the belts and the length of the blade are proportioned so that the resultant horizontal speed of the blade tip matches the belt speed when the blade tip passes beneath the surface of the belt. The resultant speed is defined as the instantaneous speed of the blade, in the direction of the belt movement, at the intersection between the blade face and the belt face. As the blade rotates and the angle between the blade surface and a perpendicular through the center of the shaft decreases, the instantaneous speed of the blade in the direction of belt travel at the point of intersection of the blade and the belt surface decreases allowing the card, moving on the belt at belt speed, to overtake the blade face. The card will be retarded by the blade until the blade reaches the point where the tip of the blade intersects the belt surface as the blade moves in the upward direction. At this point, the blade rotates up out of the way of the card allowing the belts to carry the card past the blade to the scanning station 16. The rotational speed of the blade 84 is such that it makes one complete revolution for each card fed by the conveyor system. Therefore, the blade 84 will not come down in the middle of a card and damage the card in its movement on the conveyor system. The drive system for the card feeder 10 is also synchronized with the movement of the shaft 86 so that the cards are fed in timed relation to the rotation of the shaft 86. However, the tolerances on the time at which a card may be fed are not as critical as they would be if the card must be fed in perfect timing so that it reaches the scanning station 16 at the proper time without the aid of the blades 84. The timing of the card past the scanning station is controlled by the rotational movement of the shaft 86 and not by the operation of the card feeder. It is much easier and much more accurate to control the rotation of a shaft than the operation of a card feeder.

Figure 4:
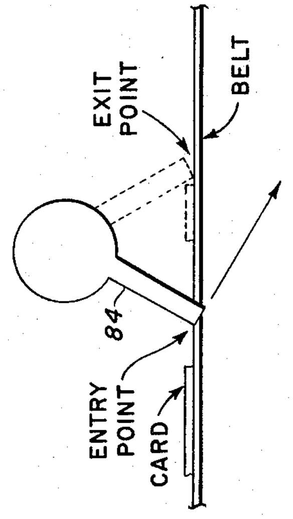

As seen in FIG. 4, if a card is placed on the belt by the feeder within limited tolerances, then the card will be moving at the same speed as the horizontal component of the blade tip when the blade passes beneath the belt and will not be in contact with the blade. As the blade rotates the point on the blade where the blade intersects the belt will be slowing down in its horizontal movement until the blade is perpendicular to the belt and will be speeding up again until the blade top again intersects the belt. During this time the card will catch up to and contact the blade. The blade retards the card until it is released at the point indicated as exit point in FIG. 4. If, for example, the card feeder can place the card on the belt within tolerances of plus or minus $\frac{1}{16}$ inch, then the difference in time for the belt to travel between the entrance point and exit point in FIG. 4 and the time for the blade to rotate between the entrance point and exit point must be at least sufficient for the belt to carry the card $\frac{1}{8}$ inch.

While the invention has been described with reference to the structure disclosed herein, it is not confined to the details set forth; and this application is intended to cover such modifications or changes as may come within the purposes of the improvements or the scope of the following claims.

What is claimed is:

1. Apparatus for positioning objects on a moving conveyor of the type wherein a plurality of spaced conveyor belts move through a path of movement past a fixed position including:

a shaft rotatably mounted adjacent to the conveyor and extending across the path of movement of the conveyor at a point ahead of the fixed position, a plurality of blades secured to the shaft and extending between the conveyor belts to a point beneath the surface of the belts during a portion of their rotation with the shaft, and means to rotate the shaft so that the blades, when extending through the conveyor belts, travel in the same direction as the belts, the blades being of a length such that the instantaneous movement of the blade tips in the direction of belt movement is the same as the movement of the belt at the points where the blades intersect the path of movement of the conveyor belts, the position of the shaft relative to the conveyor being such that the tips of the blades first intersect the path of movement of the conveyor ahead of each object on the conveyor and then intersect the path of the conveyor at the point where the object should be positioned on the conveyor.

2. A card scanning system including:

a scanning station, a card conveyor having a plurality of spaced belts moving in a fixed path past the scanning station, a card feeder positioned to feed cards individually to the card conveyor for movement past the scanning station, a card timer adapted to position the cards on the conveyor to control the timing of their movement past the scanning station, the card timer including a rotatable shaft with blade-like members extending through the spaces between the belts of the conveyor during a portion of their rotation with the shaft, the blade-like member being of a length such that the instantaneous movement of the tips of the members in the direction of the path of movement of the conveyor is the same as the speed of the conveyor at the points that the members intersect the path of travel of the conveyors, and means to rotate the shaft so that the tip of blade-like members first intersect the path of travel of the conveyor immediately ahead of each card on the conveyor and then leave the path of the conveyor at the point at which a card would be properly positioned to pass the scanning station at a desired time.

3. A method of positioning objects on a moving conveyor to time the movement of the objects past a fixed position, including:

placing an object on a conveyor ahead of the position at which the object should be located to pass the fixed position at the desired time, intercepting the movement of the object with a member traveling at a constant angular velocity and at a linear speed in the direction of movement of the conveyor, less than the speed of the conveyor, thereby retarding the movement of the object, and bringing the intercepting member up to the speed of the conveyor and removing the member from the path of the object when the object is positioned on the conveyor to pass the fixed position at the desired the conveyor to pass the fixed position at the desired time.

References Cited by the Examiner

UNITED STATES PATENTS

| | | | |
|---|---|---|---|
| 2,178,713 | 11/1939 | Wood et al. | 271—56 |
| 2,479,060 | 8/1949 | Davidson | 271—56 X |
| 2,634,126 | 4/1953 | Williams | 271—46 |

SAMUEL F. COLEMAN, *Primary Examiner.*

EVON C. BLUNK, *Examiner.*

A. C. HODGSON, *Assistant Examiner.*